(12) United States Patent
Tsujimoto

(10) Patent No.: US 9,900,187 B2
(45) Date of Patent: Feb. 20, 2018

(54) WIRELESS COMMUNICATION SYSTEM, WIRELESS COMMUNICATION DEVICE, AND WIRELESS COMMUNICATION METHOD

(71) Applicant: NEC Corporation, Minato-ku, Tokyo (JP)

(72) Inventor: Ichiro Tsujimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/114,926

(22) PCT Filed: Feb. 23, 2015

(86) PCT No.: PCT/JP2015/000868
§ 371 (c)(1),
(2) Date: Jul. 28, 2016

(87) PCT Pub. No.: WO2015/129240
PCT Pub. Date: Sep. 3, 2015

(65) Prior Publication Data
US 2016/0352542 A1 Dec. 1, 2016

(30) Foreign Application Priority Data

Feb. 27, 2014 (JP) ................................. 2014-036359

(51) Int. Cl.
*H03H 7/30* (2006.01)
*H03H 7/40* (2006.01)
(Continued)

(52) U.S. Cl.
CPC ......... *H04L 25/03057* (2013.01); *H04B 7/04* (2013.01); *H04J 3/02* (2013.01); *H04L 27/01* (2013.01) CPC H04L 25/03057; H04L 27/01; H04B 7/04; H04J 3/02; H04J 7/00
(Continued)

(58) Field of Classification Search

(56) References Cited

U.S. PATENT DOCUMENTS 5,442,626 A * 8/1995 Wei ........................... H04J 7/00
329/304
6,313,882 B1 11/2001 Limberg et al.
(Continued)

FOREIGN PATENT DOCUMENTS

JP H04-150320 5/1992
JP H11-504178 4/1999
(Continued)

OTHER PUBLICATIONS

International Search Report for PCT Application No. PCT/JP2015/000868, dated Apr. 7, 2015.
(Continued)

*Primary Examiner* — Phuong Phu

(57) ABSTRACT

A wireless communication system is provided. The wireless communication system includes a first wireless communication device; and a second wireless communication device, the first wireless communication device including a time-division multiplexing unit for time-division multiplexing a first modulated signal and a second modulated signal, and a transmission unit for transmitting a time-division multiplexed signal, the second wireless communication device including a time-division demultiplexing unit for time-division demultiplexing the time-division multiplexed signal into a first demodulated signal and a second demodulated signal, a first adaptive filter for the first demodulated signal, a second adaptive filter for the second demodulated signal, an adaptive control unit for performing an adaptive control on the first adaptive filter and outputting an output of the adaptive control to the second adaptive filter, a first demodulation unit for demodulating an output of the first adaptive filter, a second demodulation unit for demodulating an output of the second adaptive filter.

13 Claims, 10 Drawing Sheets

(51) Int. Cl.
*H03K 5/159* (2006.01)
*H04L 25/03* (2006.01)
*H04L 27/01* (2006.01)
*H04B 7/04* (2017.01)
*H04J 3/02* (2006.01)

(58) Field of Classification Search
USPC ........ 375/138, 229, 232, 233, 350, 295, 316
See application file for complete search history.

(56) References Cited

U.S. PATENT DOCUMENTS

| | | |
|---|---|---|
| 2002/0018517 A1 | 2/2002 | Hara |
| 2002/0159505 A1 | 10/2002 | Hayashibara |
| 2003/0063680 A1 | 4/2003 | Nedic et al. |
| 2003/0112770 A1 | 6/2003 | Sugiyama |
| 2004/0224657 A1 | 11/2004 | Hiromi Matsuzaka |
| 2006/0072692 A1 | 4/2006 | Gifford et al. |

FOREIGN PATENT DOCUMENTS

| | | |
|---|---|---|
| JP | 2001-257627 | 9/2001 |
| JP | 2002-009675 | 1/2002 |
| JP | 2002-026787 | 1/2002 |
| JP | 2004-336563 | 11/2004 |

OTHER PUBLICATIONS

English translation of Written opinion for PCT Application No. PCT/JP2015/000868.

Japanese OA for JP Application 2014-036359 dated on Sep. 12, 2014.

Extended European Search Report for EP Application No. EP15755040.1 dated Sep. 7, 2017.

* cited by examiner

QPSK

8PSK

16APSK

32APSK

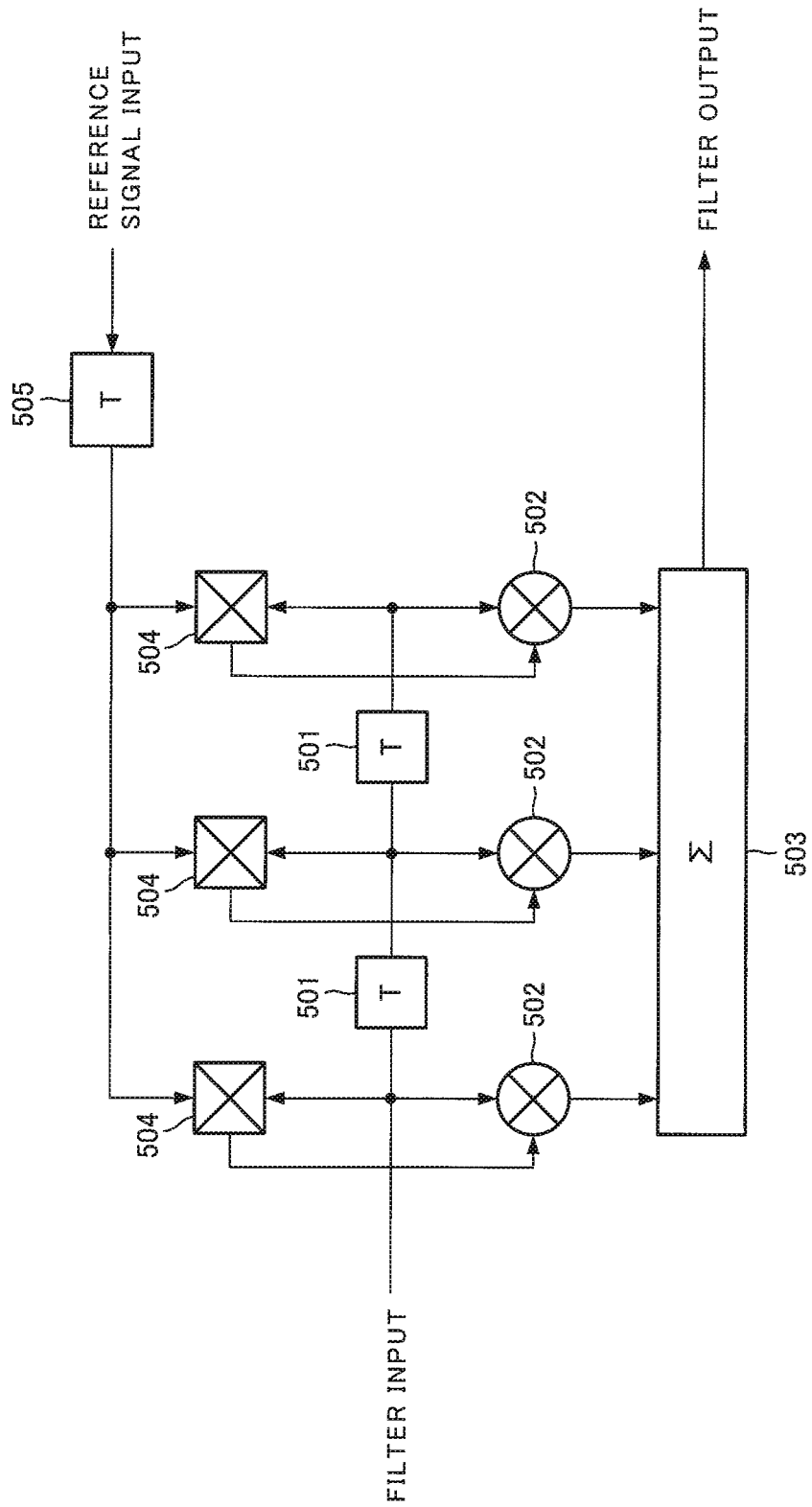

WIRELESS COMMUNICATION SYSTEM, WIRELESS COMMUNICATION DEVICE, AND WIRELESS COMMUNICATION METHOD

This application is a National Stage Entry of PCT/JP2015/000868 filed on Feb. 23, 2015, which claims priority from Japanese Patent Application 2014-036359 filed on Feb 27, 2014, the contents of all of which are incorporated herein by reference, in their entirety.

TECHNICAL FIELD

The present invention relates to a wireless communication systems, wireless communication devices, and wireless communication methods, in particular, to a wireless communication system, a wireless communication device, and a wireless communication method that perform optimum communication by changing a modulation scheme depending on a state of a transmission channel.

BACKGROUND ART

A recent wireless communication system employs a variable modulation scheme in which the transmission capacity is expanded by increasing a modulation level when fading in a transmission channel is not severe and the transmission capacity is reduced by decreasing a modulation level when fading is severe.

Diversity communication is generally thought to be essential in a case of a multipath-fading channel. In particular, quadruple-diversity reception is generally thought to be necessary in a case of the tropospheric scatter propagation.

FIG. 7 is a block diagram illustrating a configuration of a common wireless communication device performing diversity reception. Referring to FIG. 7, the wireless communication device includes four systems of matching filters 601, a combiner 602, a feedforward filter 603, a combiner 604, a demodulator 605, a feedback filter 606, and a subtractor 607.

The wireless communication device illustrated in FIG. 7 performs quadruple-diversity reception by maximum ratio combining using the matching filters 601. Specifically, received signals 1 to 4 are passed through the four systems of the matching filters 601. The matching filters 601 gather time-dispersed multipath signals at a reference timing, and using the signals as received signals maximizes a signal-to-noise ratio (SNR). The combiner 602 combines the outputs of the matching filters of the respective systems. Thus, the maximum ratio combining in the quadruple diversity is performed. A decision feedback equalizer composed of the feedforward filter 603 and the feedback filter 606 eliminates intersymbol interference.

As a related art, PTL 1 describes a diversity reception device that can reduce the effects of the fading and a multipath generated in a channel.

CITATION LIST

Patent Literature

[PTL 1] Japanese Unexamined Patent Application Publication No. H04-150320

SUMMARY OF INVENTION

Technical Problem

It is necessary in a common variable modulation scheme to be able to change adaptive equalization processing with an adaptive filter and the like depending on a modulation scheme. The adaptive equalization processing requires processing to perform adaptive filtering on signals and adaptive control processing to perform sequential correction of a tap coefficient of the adaptive filter are. Consequently, it is necessary to provide an adaptive control processing circuit depending on the type of demodulation scheme, which leads to the problem that a receiving wireless communication device grows to great size.

Accordingly, in a transmission system for a plurality of modulated waves undergoing variable modulation, it is demanded to prevent a device, which is related to adaptive equalization processing to handle fading and the like arising in the transmission system, from growing to great size, and it is demanded to downsize the device. In particular, it becomes a challenge to prevent the receiving wireless communication device from growing to great size when the variable modulation is used in a multipath-fading channel.

The object of the present invention is to provide a wireless communication system, a wireless communication device, and a wireless communication method that are capable of preventing a receiving wireless communication device from growing to great size when the variable modulation is used in a multipath-fading channel.

Solution to Problem

A wireless communication system according to an exemplary aspect of the present invention includes: a first wireless communication device; and a second wireless communication device, the first wireless communication device including time-division multiplexing means for time-division multiplexing a first modulated signal and a second modulated signal, and transmission means for transmitting a time-division multiplexed signal, the second wireless communication device including time-division demultiplexing means for time-division demultiplexing the time-division multiplexed signal into a first demodulated signal and a second demodulated signal, a first adaptive filter for the first demodulated signal, a second adaptive filter for the second demodulated signal, adaptive control means for performing an adaptive control on the first adaptive filter and outputting an output of the adaptive control to the second adaptive filter, first demodulation means for demodulating an output of the first adaptive filter, second demodulation means for demodulating an output of the second adaptive filter.

A wireless communication device according to an exemplary aspect of the present invention includes: time-division demultiplexing means for time-division demultiplexing a signal formed by time-division multiplexing a first modulated signal and a second modulated signal into a first demodulated signal and a second demodulated signal; a first adaptive filter for the first demodulated signal; a second adaptive filter for the second demodulated signal; adaptive control means for performing an adaptive control on the first adaptive filter and outputting an output of the adaptive control to the second adaptive filter; first demodulation means for demodulating an output of the first adaptive filter; and second demodulation means for demodulating an output of the second adaptive filter.

A wireless communication method for use in a wireless communication device according to an exemplary aspect of the present invention, wherein the wireless communication device includes time-division demultiplexing means for time-division demultiplexing a first modulated signal and a second modulated signal, the first modulated signal and the second modulated signal being time-division multiplexed, into a first demodulated signal and a second demodulated signal, a first adaptive filter for the first demodulated signal, a second adaptive filter for the second demodulated signal, first demodulation means for demodulating an output of the first adaptive filter, and second demodulation means for demodulating an output of the second adaptive filter, performing an adaptive control on the first adaptive filter, and outputting an output of the adaptive control to the second adaptive filter.

Advantageous Effects of Invention

According to the present invention, it becomes possible to prevent a receiving wireless communication device from growing to great size when the variable modulation is used in a multipath-fading channel.

BRIEF DESCRIPTION OF DRAWINGS

FIG. 5 is a block diagram illustrating a configuration example of an adaptive filter in accordance with the third and fourth exemplary embodiments of the present invention.

DESCRIPTION OF EMBODIMENTS

[A First Exemplary Embodiment]

Figure 1:
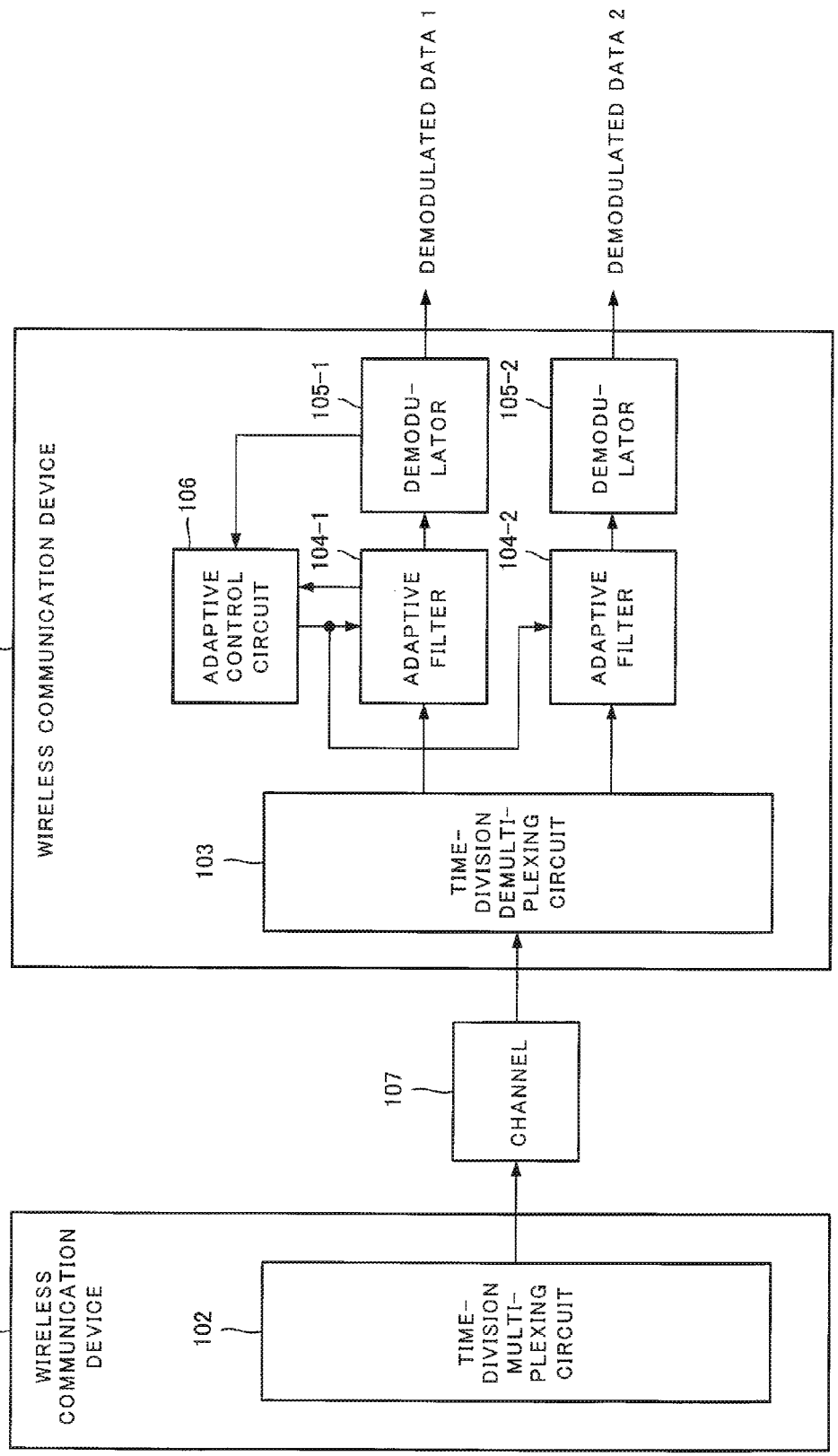
FIG. 1 is a block diagram illustrating a configuration example of a wireless communication system in accordance with a first exemplary embodiment of the present invention.

FIG. 1 is a block diagram illustrating a configuration example of a wireless communication system in accordance with a first exemplary embodiment of the present invention. The wireless communication system includes a first wireless communication device 10 (transmitting side) and a second wireless communication device 20 (receiving side).

The first wireless communication device 10 includes a time-division multiplexing circuit 102 (time-division multiplexing means) for time-division multiplexing a first modulated signal and a second modulated signal, and transmission means (not illustrated) for transmitting a time-division multiplexed signal.

The second wireless communication device 20 includes a time-division demultiplexing circuit 103 (time-division demultiplexing means), an adaptive filter 104-1 (a first adaptive filter), an adaptive filter 104-2 (a second adaptive filter), an adaptive control circuit 106 (adaptive control means), a demodulator 105-1 (first demodulation means), and a demodulator 105-2 (second demodulation means).

The time-division demultiplexing circuit 103 time-division demultiplexes time-division multiplexed signals, respective demultiplexed signals resulting in a first demodulated signal and a second demodulated signal.

The adaptive filter 104-1 is an adaptive filter for the first demodulated signal. The adaptive filter 104-2 is an adaptive filter for the second demodulated signal.

The adaptive control circuit 106 performs an adaptive control on the adaptive filter 104-1 and outputs an output of the adaptive control to the adaptive filter 104-2.

The demodulator 105-1 demodulates an output of the adaptive filter 104-1. The demodulator 105-2 demodulates an output of the adaptive filter 104-2.

The present exemplary embodiment is characterized in that, with respect to an adaptive filter for dual systems of modulated waves, the adaptive control is performed on a first system only and the results of the adaptive control for the first system is employed for a second system. This enables a device related to the adaptive control to become reduced in size.

Therefore, according to the wireless communication system of the present exemplary embodiment, it becomes possible to prevent a receiving wireless communication device from growing to great size when the variable modulation is used in a multipath-fading channel.

Although dual systems of modulated waves have been described above, the present exemplary embodiment is not limited to the case of dual systems of modulated waves. That is to say, with respect to adaptive filters for N systems (N is an integer greater than or equal to two) of modulated waves, similarly, the adaptive control is performed on a single system only and the results of the adaptive control for the single system are used for the other (N−1) systems, which enables a device related to the adaptive control to become reduced in size.

[A Second Exemplary Embodiment]

Figure 2:
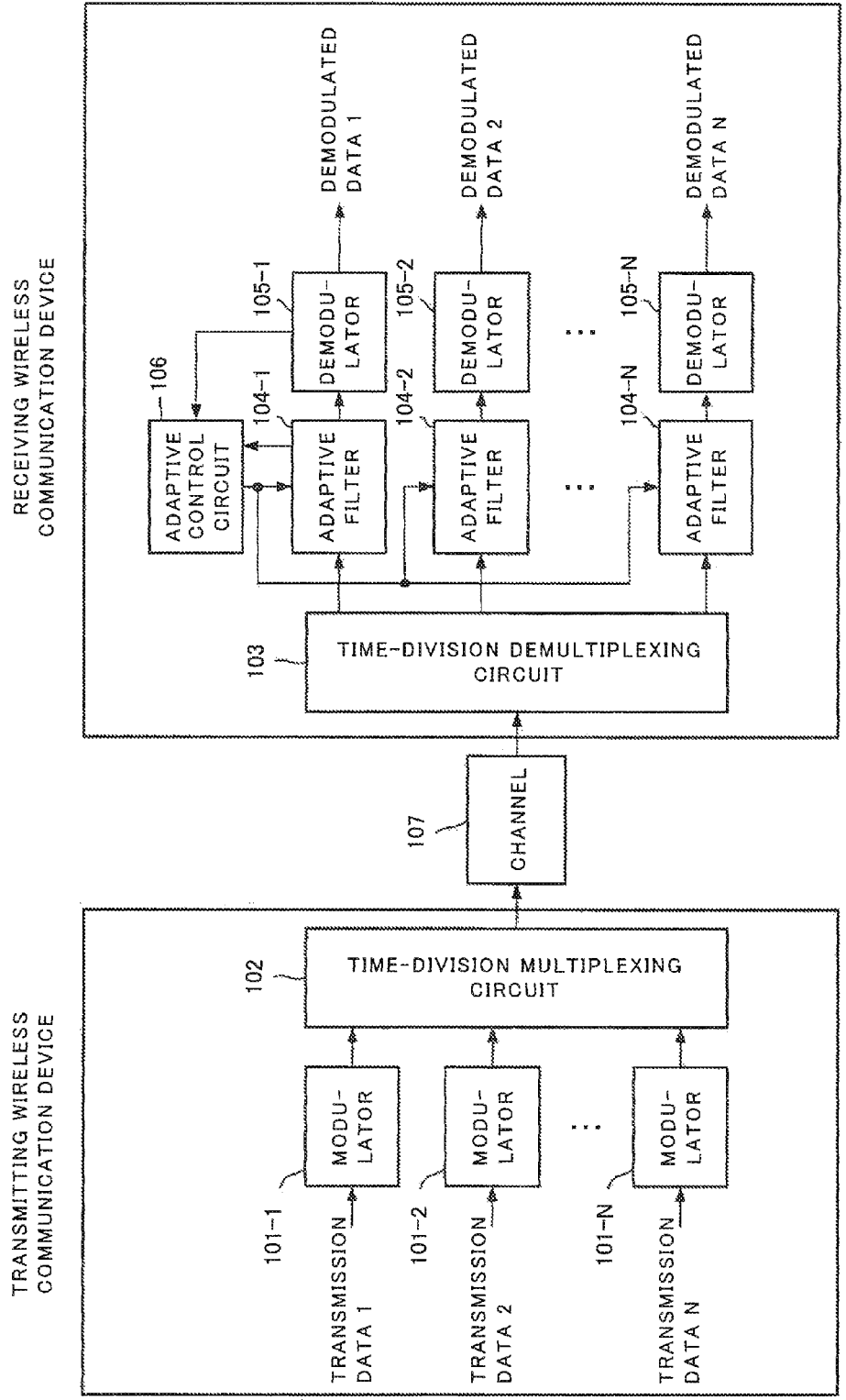
FIG. 2 is a block diagram illustrating a configuration example of a wireless communication system in accordance with to a second exemplary embodiment of the present invention.

FIG. 2 is a block diagram illustrating a configuration example of a wireless communication system in accordance with a second exemplary embodiment of the present invention. The wireless communication system includes a transmitting wireless communication device and a receiving wireless communication device.

The transmitting wireless communication device includes N pieces of modulators 101-1 to 101-N and a time-division multiplexing circuit 102.

The receiving wireless communication device includes a time-division demultiplexing circuit 103, N pieces of adaptive filters 104-1 to 104-N, N pieces of demodulators 105-1 to 105-N, and an adaptive control circuit 106.

The transmitting side is connected to the receiving side through a channel 107.

In the transmitting wireless communication device, the modulator 101-1 has a relatively small modulation level, whereas the modulators 101-2 to 101-N change modulation levels depending on channel conditions, and change transmission capacity depending on propagation conditions. The time-division multiplexing circuit 102 time-division multiplexes the outputs of the N pieces of modulators 101-1 to 101-N and transmits the multiplexed signals to the channel 107.

In the receiving wireless communication device, the time-division demultiplexing circuit 103 time-division demultiplexes received signals from the channel 107 and outputs N systems of received signals to N pieces of the adaptive filters 104-1 to 104-N, respectively. The adaptive filters 104-1 to 104-N equalize channel distortion. The N system outputs are made to pass through N pieces of the demodulators 105-1 to 105-N respectively, and then N systems of received data signals are extracted.

When the variable modulation is used in a multipath-fading channel, it is necessary to make diversity and adaptive equalization support the variable modulation. This can cause a device to increase in size.

According to the present exemplary embodiment, the transmitting end transmits, by time-division multiplexing, a modulated wave having a fixed and small (minimum, for example) modulation level and a modulated wave generated by the variable modulation depending on propagation states. On the other hand, the receiving end demultiplexes, by time-division demultiplexing, received signals into a fixed modulated wave and a modulated wave generated by the variable modulation, and performs automatic equalization by adaptive filters or the like, respectively. With regard to the fixed modulated wave, the adaptive control is performed on the adaptive filter using a decision error signal of the demodulator. In contrast, for the modulated wave generated by the variable modulation, the adaptive control on the fixed modulated wave is employed, and the adaptive control is not performed on the modulated wave generated by the variable modulation. This eliminates the need for providing the adaptive control for all the modulated waves, and therefore a device can be prevented from increasing in size.

With respect to adaptive filters for N systems of modulated waves, for example, the adaptive control is performed on a single system only and the results of the adaptive control for the single system are used for the other (N−1) systems, which enables a device related to the adaptive control to become reduced in size.

Since the adaptive control in N systems of demodulators is performed on a single system only, it is only necessary to obtain a decision error signal of modulation for the single system, which eliminates the need for extracting decision error signals of the demodulators for the other systems. Therefore, it becomes possible to simplify the configuration of a demodulator for a system without the adaptive control.

[A Third Exemplary Embodiment]

Figure 3:
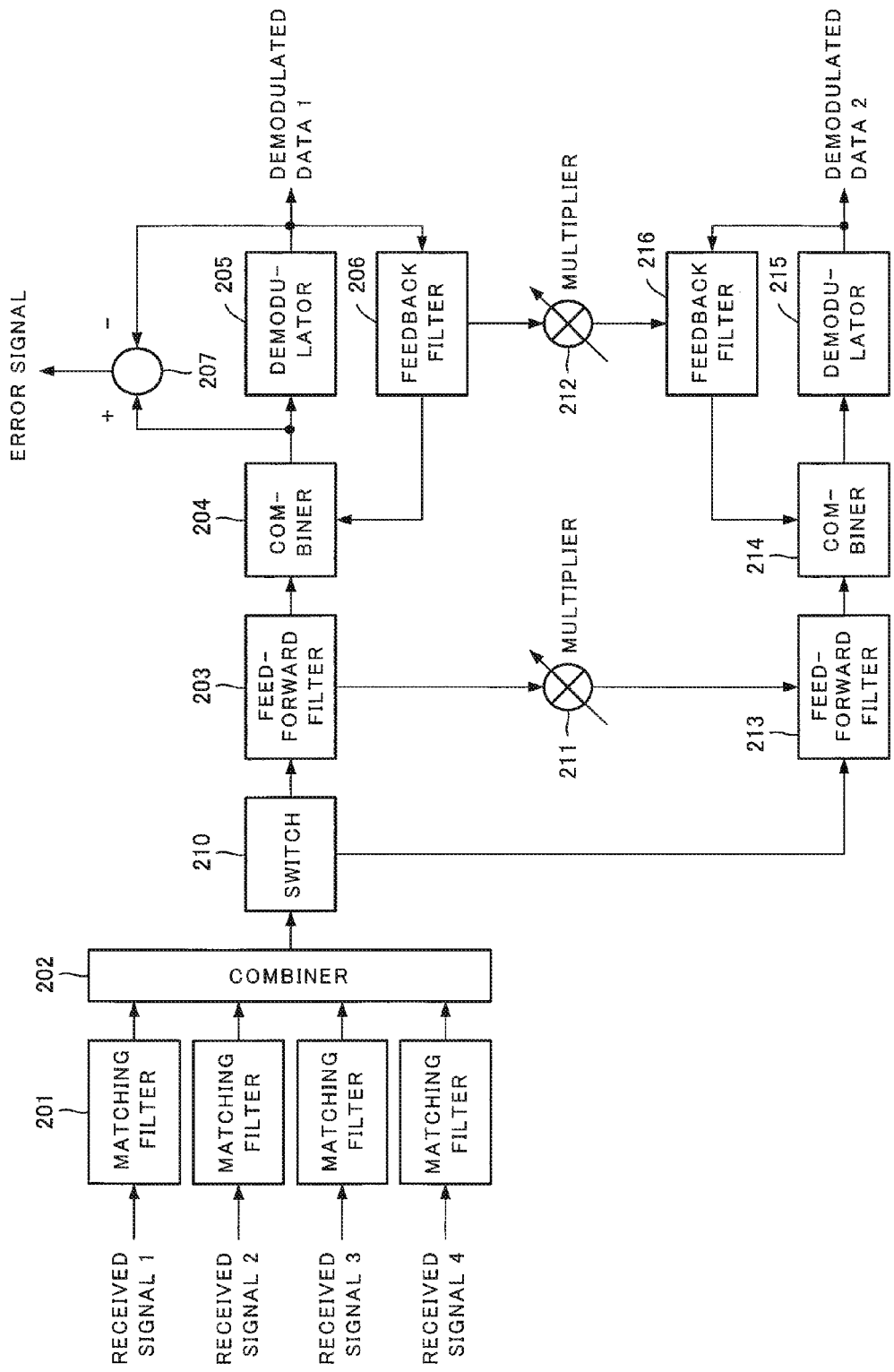
FIG. 3 is a block diagram illustrating a configuration example of a receiving wireless communication device in a wireless communication system in accordance with a third exemplary embodiment of the present invention.

FIG. 3 is a block diagram illustrating a configuration example of a receiving wireless communication device in a wireless communication system in accordance with a third exemplary embodiment of the present invention.

The receiving wireless communication device includes N pieces of matching filters 201, a combiner 202, a switch 210, feedforward filters 203, 213, combiners 204, 214, demodulators 205, 215, feedback filters 206, 216, a subtractor 207, and multipliers 211, 212.

The diversity communication generally becomes essential in a case of a multipath-fading channel. In particular, the quadruple-diversity reception is generally required in a case of the tropospheric scatter propagation. In FIG. 3, received signals 1 to 4 are passed through four systems of the matching filters 201. The matching filters 201 gather time-dispersed multipath signals at a reference timing, and using the signals as received signals maximizes a signal-to-noise ratio (SNR). The combiner 202 combines the outputs of the matching filters 201 of the respective systems. Thus, the maximum ratio combining in the quadruple diversity is performed.

The switch 210 time-division demultiplexes received signals that have been diversity-combined. In the example illustrated in FIG. 3, the switch 210 demultiplexes dual systems of time-division multiplexed signals into a first received signal and a second received signal. The feedforward filter 203 receives the first received signal. On the other hand, the feedforward filter 213 receives the second received signal.

The feedforward filter 203 eliminates intersymbol interference due to a leading response of the impulse response in a transmission system. The output of the feedforward filter 203 is inputted into the demodulator 205 through the combiner 204. The demodulator 205 demodulates received signals into demodulated data 1. The demodulated data 1 are passed through the feedback filter 206, and function in the combiner 204 to cancel intersymbol interference due to a lagging response of the impulse response in a channel from the received signal. The feedforward filter 203 and the feedback filter 206 are referred to as a decision feedback equalizer (DFE).

Similarly, the feedforward filter 213 eliminates intersymbol interference due to a leading response of the impulse response in a transmission system. The output of the feedforward filter 213 is inputted into the demodulator 215 through the combiner 214. The demodulator 215 demodulates received signals into demodulated data 2. The demodulated data 2 are passed through the feedback filter 216, and function in the combiner 214 to cancel intersymbol interference due to a lagging response of the impulse response of a channel from the received signal. The feedforward filter 213 and the feedback filter 216 are referred to as a decision feedback equalizer.

The feedforward filter 203 and the feedback filter 206 in the system corresponding to the demodulated data 1 perform sequential correction (adaptive control) of filter tap coefficients by an adaptive algorithm using decision error signals of the demodulator 205 (the output of the subtractor 207). The modulation level of the modulated signal in the first system is set to a small value, which enables a device related to the adaptive control using an adaptive algorithm to become reduced in size.

On the other hand, the modulation scheme of the modulated signal in the second system is changed depending on the channel response, and therefore the transmission capacity is expanded by increasing the modulation level when the fading is not severe As an example of digital video transmission, a DVB-S2 standard is employed in Europe. The standard specifies that modulation schemes are alterable among QPSK, 8PSK, 16APSK, and 32APSK, and that the LDPC coding rate is also variable. According to the specifications, circuits become complicated which are used for generating demodulator error signals and performing the adaptive control of the adaptive filter, which causes a device to increase in size.

In the above description, DVB-S2 stands for Digital Video Broadcasting-Satellite-Second Generation. QPSK stands for quadrature phase shift keying, 8PSK stands for 8 phase shift keying, 16APSK stands for 16 amplitude phase shift keying, and 32APSK stands for 32 amplitude phase shift keying. LDPC stands for low-density parity check.

In the present exemplary embodiment, a transmission system having a relatively small modulation level is configured as the first system, and the results of the adaptive control for the system (tap coefficients of the feedforward filter and the feedback filter) are employed for adaptive filters in the second system. This enables circuits to be reduced which are used for performing the adaptive control and generating decision error signals, and prevents the device from growing to great size.

However, tap coefficients of an adaptive filter, which is used for received signals having a small (minimum, for example) modulation level, needs scaling for received signals having a different modulation level. Accordingly, the tap coefficient of the feedforward filter 203 in FIG. 3 is multiplied by a scale factor (multiplier factor) in the multiplier 211 and is output as a tap coefficient of the feedforward filter 213. Similarly, the tap coefficient of the feedback filter 206 is multiplied by a scale factor in the multiplier 212 and is output as a tap coefficient of the feedback filter 216.

The scale factor varies in response to changes in the modulation level in the system corresponding to the demodulator 215. Therefore, having obtained scale factors in advance, the multiplier 211 and the multiplier 212 may be multiplied by a scale factor depending on changes in the modulation level.

Figure 4A:
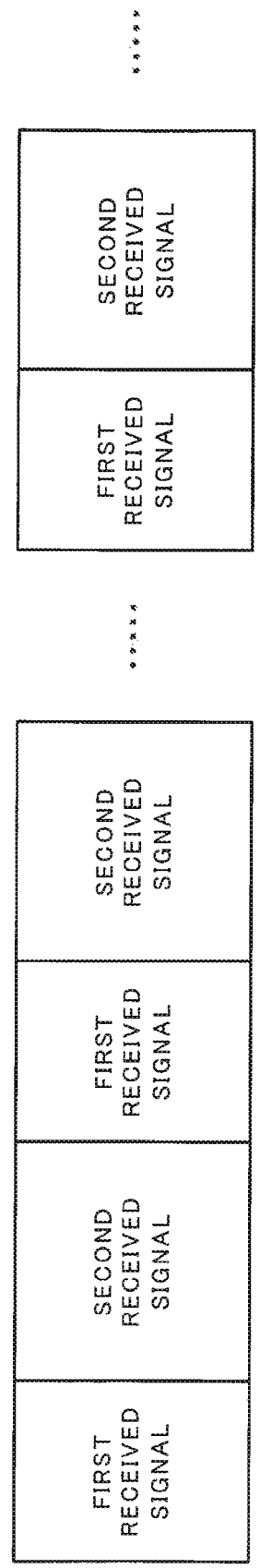
FIG. 4A illustrates a first received signal and a second received signal that are time-division multiplexed.
Figure 4B:
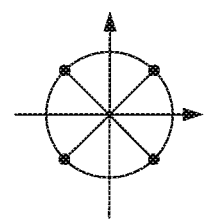
FIG. 4B illustrates a constellation of QPSK modulated signals.
Figure 4C:
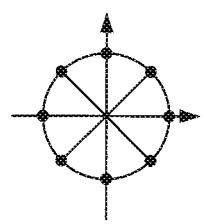
FIG. 4C illustrates a constellation of 8PSK modulated signals.
Figure 4D:
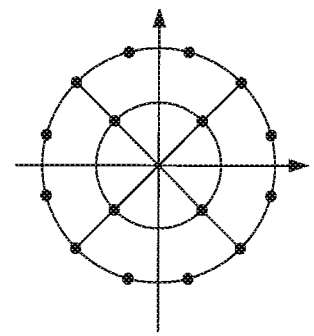
FIG. 4D illustrates a constellation of 16APSK modulated signals.
Figure 4E:
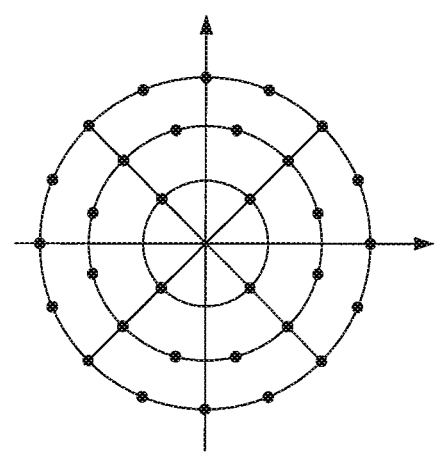
FIG. 4E illustrates a constellation of 32APSK modulated signals.

FIGS. 4A to 4E are diagrams to illustrate the operation of a wireless communication system including the receiving wireless communication device illustrated in FIG. 3. Specifically, FIG. 4A illustrates a first received signal and a second received signal that are time-division multiplexed. FIGS. 4B, 4C, 4D, and 4E illustrate constellations of respective modulated signals of QPSK, 8PSK, 16APSK, and 32APSK.

In FIG. 3, the demodulator 205 demodulates QPSK signals constantly. By contrast, the demodulator 215 demodulates signals variably with respect to QPSK, 8PSK, 16APSK, and 32APSK depending on a channel state.

FIG. 5 is a block diagram illustrating a configuration example of the adaptive filter. The adaptive filter includes a delay element 501 of a tapped delay line, a complex multiplier 502, a combining circuit 503, a complex correlator 504, and a delay-adjusting delay element 505.

If received signals are inputted into a filter input, and decision error signals of the demodulator are inputted into a reference signal input in FIG. 5, the adaptive filter illustrated in FIG. 5 corresponds to the feedforward filters 203, 213 in the decision feedback equalizer illustrated in FIG. 3.

On the other hand, if data of the demodulator are inputted into the filter input, and decision error signals of the demodulator are inputted into the reference signal input in FIG. 5, the adaptive filter illustrated in FIG. 5 corresponds to the feedback filters 206, 216 in the decision feedback equalizer illustrated in FIG. 3.

The delay-adjusting delay element 505 and the complex correlator 504 illustrated in FIG. 5 perform sequential correction of tap coefficients.

In the wireless communication system in accordance with the present exemplary embodiment, the transmitting wireless communication device alternately transmits a modulated wave having a relatively small modulation level and a modulated wave having a relatively large modulation level by means for transmitting signals modulated by multiple modulation schemes using the time-division multiplexing.

Then, the receiving wireless communication device performs adaptive equalization processing on each modulated wave. Here, the adaptive control to perform sequential correction on tap coefficients of the adaptive filter is performed on the modulated wave having the smaller modulation level only. Based on the results of the adaptive control, adaptive equalization processing is performed on the modulated wave having the larger modulation level. This enables a device required for the adaptive control to become reduced in size.

[A Fourth Exemplary Embodiment]

Figure 6:
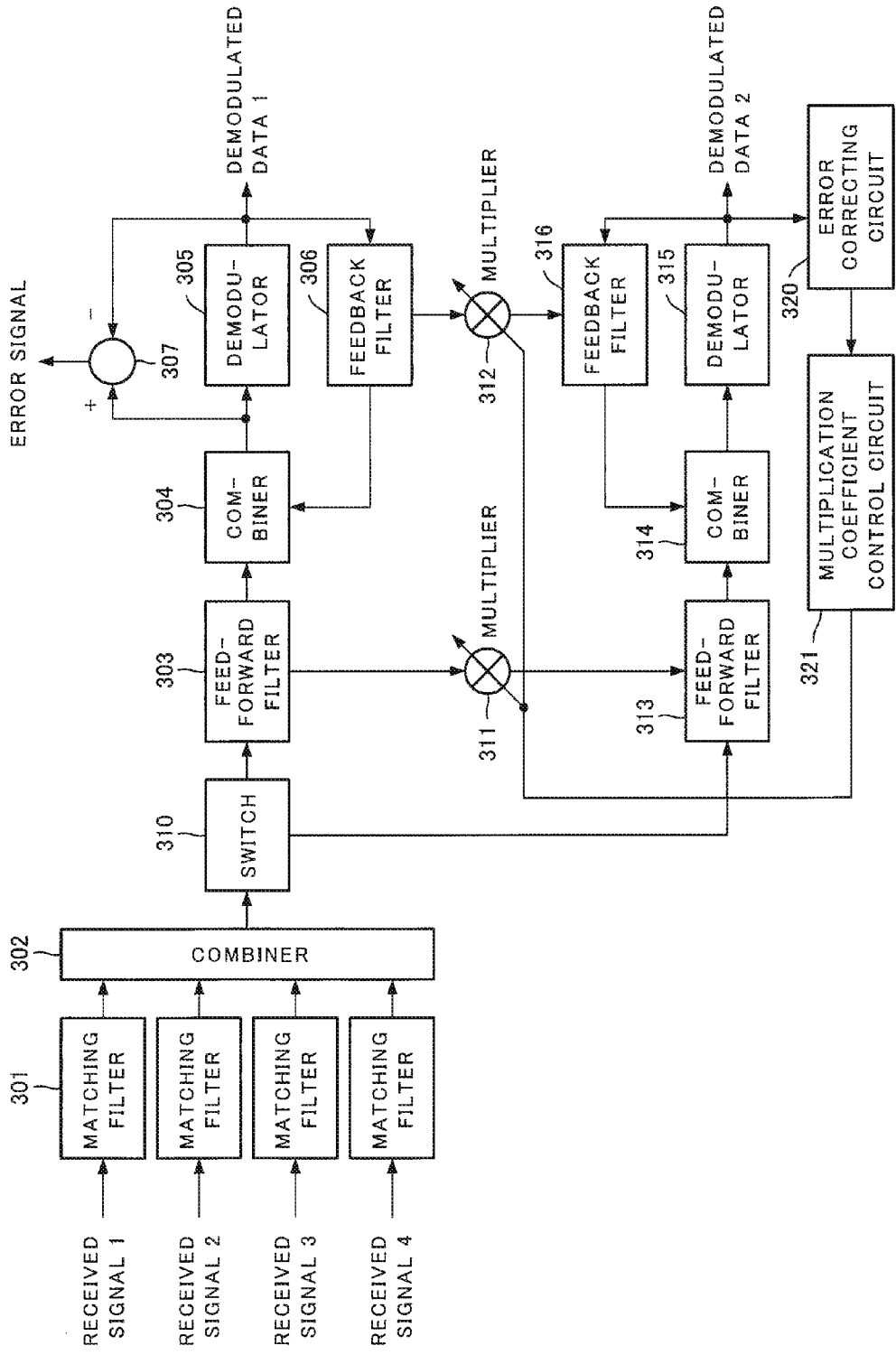
FIG. 6 is a block diagram illustrating a configuration example of a receiving wireless communication device of a wireless communication system in accordance with the fourth exemplary embodiment of the present invention.
Figure 7:
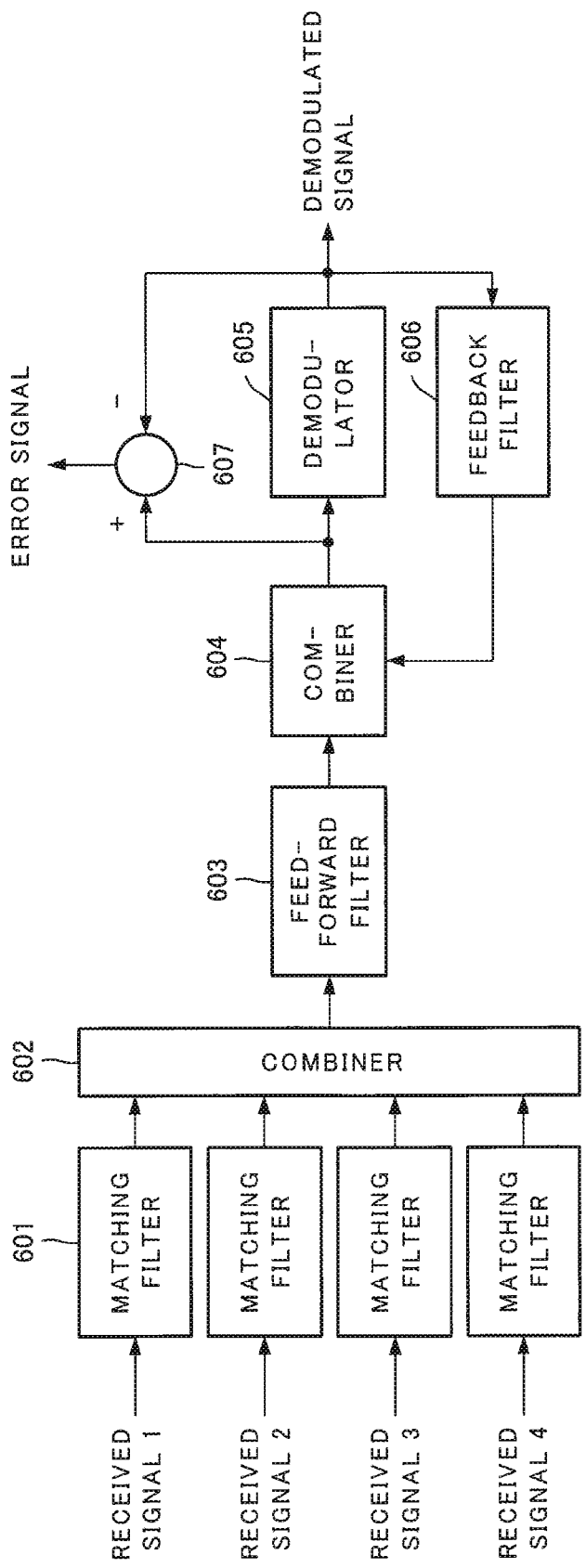
FIG. 7 is a block diagram illustrating a configuration of a common wireless communication device to perform diversity reception.

FIG. 6 is a block diagram illustrating a configuration example of a receiving wireless communication device of a wireless communication system in accordance with a fourth exemplary embodiment of the present invention.

The receiving wireless communication device includes N pieces of matching filters 301, a combiner 302, a switch 310, feedforward filters 303, 313, combiners 304, 314, demodulators 305, 315, feedback filters 306, 316, a subtractor 307, multipliers 311, 312, combiners 304, 314, an error correcting circuit 320, and a multiplication coefficient control circuit 321.

In the above-mentioned third exemplary embodiment, having obtained in advance a scale factor (multiplier factor) by which the multiplier 211 and the multiplier 212 are multiplied, the scale factor is multiplied depending on the variable modulation.

On the other hand, the present exemplary embodiment is characterized in that the error correcting circuit 320 performs error correction on demodulated data 2 from the demodulator 315, and that the multiplication coefficient control circuit 321 controls a scale factor value so as to reduce (minimize, for example) a relevant error rate.

FIGS. 4A to 4E are diagrams to illustrate the operation of a wireless communication system including the receiving wireless communication device illustrated in FIG. 6. The description of FIGS. 4A to 4E is omitted here because of having been described already in the third exemplary embodiment.

In FIG. 6, the demodulator 305 demodulates QPSK signals constantly. By contrast, the demodulator 315 demodulates signals variably with respect to QPSK, 8PSK, 16APSK, and 32APSK depending on a channel state.

FIG. 5 is a block diagram illustrating a configuration example of the adaptive filter. The description of the block diagram is omitted here because of having been described already in the third exemplary embodiment.

If received signals are inputted into a filter input, and decision error signals of the demodulator are inputted into the reference signal input in FIG. 5, the adaptive filter illustrated in FIG. 5 corresponds to the feedforward filters 303, 313 in the decision feedback equalizer illustrated in FIG. 6.

On the other hand, if data of the demodulator are inputted into the filter input, and decision error signals of the demodulator are inputted into the reference signal input in FIG. 5, the adaptive filter illustrated in FIG. 5 corresponds to the feedback filters 306, 316 in the decision feedback equalizer illustrated in FIG. 6.

The delay-adjusting delay element 505 and the complex correlator 504 illustrated in FIG. 5 perform sequential correction of tap coefficients.

As is the case with the wireless communication system of the third exemplary embodiment, the wireless communication system in accordance with the present exemplary embodiment allows a device required for the adaptive control to become reduced in size. Additionally, according to the present exemplary embodiment, it becomes possible to decrease an error rate by controlling a scale factor value for tap coefficients based on the error rate in performing the error correction.

In the above-mentioned third and fourth exemplary embodiments, the modulation schemes of QPSK, 8PSK, 16APSK, and 32APSK have been given as examples. However, the above is just an example, and the other modulation schemes may be employed.

[A Modified Example]

The above-mentioned first to fourth exemplary embodiments are available for the communication system in which variable modulation transmission is performed under the propagation with multipath fading, and the communication is performed with transmission capacity depending on the channel state, for example.

The above-mentioned first to fourth exemplary embodiments are available for the tropospheric scatter propagation communication or the terrestrial mobile communication, and particularly for the digital high-definition television transmission in a channel with severe multipath fading by functions of diversity, automatic equalization, variable modulation, and Internet Protocol (IP) communication.

The whole or part of the exemplary embodiments disclosed above can be described as, but not limited to, the following supplementary notes.

(Supplementary Note 1)

A wireless communication system, comprising:
a first wireless communication device; and a second wireless communication device,
the first wireless communication device including
time-division multiplexing means for time-division multiplexing a first modulated signal and a second modulated signal, and
transmission means for transmitting a time-division multiplexed signal,
the second wireless communication device including
time-division demultiplexing means for time-division demultiplexing the time-division multiplexed signal into a first demodulated signal and a second demodulated signal,
a first adaptive filter for the first demodulated signal,
a second adaptive filter for the second demodulated signal,
adaptive control means for performing an adaptive control on the first adaptive filter and outputting an output of the adaptive control to the second adaptive filter,
first demodulation means for demodulating an output of the first adaptive filter,
second demodulation means for demodulating an output of the second adaptive filter.

(Supplementary Note 2)

The wireless communication system according to Supplementary note 1,
wherein the transmission means time-division multiplexes and diversity-transmits the first modulated signal and the second modulated signal, and
the time-division demultiplexing means includes
means for diversity-combining diversity-transmitted signals using a matching filter, and
switching means for time-division demultiplexing a diversity-combined signal and outputting demultiplexed signals as the first demodulated signal and the second demodulated signal.

(Supplementary Note 3)

The wireless communication system according to Supplementary note 1 or 2,
wherein the first adaptive filter performs decision feedback equalization on the first modulated signal based on the adaptive control by the adaptive control means, and
the second adaptive filter performs decision feedback equalization on the second modulated signal using a tap coefficient obtained by multiplying a tap coefficient in the adaptive control by a multiplier factor.

(Supplementary Note 4)

The wireless communication system according to Supplementary note 3,
wherein the second wireless communication device further includes multiplication means for multiplying the tap coefficient in the adaptive control by the multiplier factor.

(Supplementary Note 5)

The wireless communication system according to supplementary note 3 or 4,
wherein the second wireless communication device further includes error correcting means for performing error correction on an output of the second demodulator, and
multiplication coefficient control means for controlling a multiplier factor by which the tap coefficient to be multiplied depending on a result of the error correction.

(Supplementary Note 6)

A wireless communication device, comprising:
time-division demultiplexing means for time-division demultiplexing a signal formed by time-division multiplexing a first modulated signal and a second modulated signal into a first demodulated signal and a second demodulated signal;
a first adaptive filter for the first demodulated signal;
a second adaptive filter for the second demodulated signal;
adaptive control means for performing an adaptive control on the first adaptive filter and outputting an output of the adaptive control to the second adaptive filter;
first demodulation means for demodulating an output of the first adaptive filter; and
second demodulation means for demodulating an output of the second adaptive filter.

(Supplementary Note 7)

The wireless communication device according to Supplementary note 6,
wherein the time-division demultiplexing means includes
means for diversity-combining the first modulated signal and the second modulated signal using a matching filter, the first modulated signal and the second modulated signal being time-division multiplexed and diversity-transmitted, and
switching means for time-division demultiplexing diversity-combined signal and outputting demultiplexed signals as the first demodulated signal and the second demodulated signal.

(Supplementary Note 8)

The wireless communication device according to Supplementary note 6 or 7,
wherein the first adaptive filter performs decision feedback equalization on the first modulated signal based on the adaptive control by the adaptive control means, and
the second adaptive filter performs decision feedback equalization on the second modulated signal using a tap coefficient obtained by multiplying a tap coefficient in the adaptive control by a multiplier factor.

(Supplementary Note 9)

The wireless communication device according to Supplementary note 8, further comprising
multiplication means for multiplying a tap coefficient in the adaptive control by the multiplier factor.

(Supplementary Note 10)

The wireless communication device according to Supplementary note 8 or 9, further comprising
error correcting means for performing error correction on an output of the second demodulator; and
multiplication coefficient control means for controlling a multiplier factor by which the tap coefficient to be multiplied depending on a result of the error correction.

(Supplementary Note 11)

A wireless communication method for use in a wireless communication device, wherein the wireless communication device includes
time-division demultiplexing means for time-division demultiplexing a first modulated signal and a second modulated signal, the first modulated signal and the second modulated signal being time-division multiplexed, into a first demodulated signal and a second demodulated signal,
a first adaptive filter for the first demodulated signal,
a second adaptive filter for the second demodulated signal,
first demodulation means for demodulating an output of the first adaptive filter, and
second demodulation means for demodulating an output of the second adaptive filter,
performing an adaptive control on the first adaptive filter, and
outputting an output of the adaptive control to the second adaptive filter.

(Supplementary Note 12)

The wireless communication method according to Supplementary note 11, wherein
the wireless communication device
diversity-combines the first modulated signal and the second modulated signal, being time-division multiplexed and diversity-transmitted, by use of a matching filter, and
time-division demultiplexes the diversity-combined signal into the first demodulated signal and the second demodulated signal.

(Supplementary Note 13)

The wireless communication method according to Supplementary note 11 or 12, wherein
the first adaptive filter performs decision feedback equalization based on adaptive control on the first modulated signal, and
the second adaptive filter performs decision feedback equalization on the second modulated signal, by use of a tap coefficient obtained by multiplying a tap coefficient in the adaptive control by a multiplier.

(Supplementary Note 14)

The wireless communication method according to Supplementary note 13, wherein
the wireless communication device performs error correction on an output of the second demodulator, and
controls a multiplier by which the tap coefficient is multiplied, in accordance with the error correction result.

The entire disclosure of the aforementioned PTL is incorporated herein by reference thereto. The exemplary embodiments may be changed and adjusted within the scope of the entire disclosure (including the claims) of the present invention and on the basis of the basic technological concept thereof. Further, within the scope of the claims of the present invention, various disclosed elements (including the respective elements of the claims, the respective elements of the exemplary embodiments, and the respective elements of the drawings) may be combined and selected in a variety of ways. That is, it is apparent that the present invention includes various modifications and changes that may be made by a person skilled in the art on the basis of the entire disclosure including the claims, and the technological concept. In particular, with regard to numerical ranges described herein, any numerical values and small ranges included in the relevant ranges should be interpreted to be specifically described, even when there is no particular description thereof.

While the invention has been particularly shown and described with reference to exemplary embodiments thereof, the invention is not limited to these embodiments. It will be understood by those of ordinary skill in the art that various changes in form and details may be made therein within the scope of the present invention.

This application is based upon and claims the benefit of priority from Japanese Patent Application No. 2014-036359, filed on Feb. 27, 2014, the disclosure of which is incorporated herein in its entirety by reference.

REFERENCE SIGNS LIST

10, 20 Wireless communication device
101-1 to 101-N Modulator
102 Time-division multiplexing circuit
103 Time-division demultiplexing circuit
104-1 to 104-N Adaptive filter
105-1 to 105-N, 205, 215, 305, 315, 605 Demodulator
106 Adaptive control circuit
107 Channel
201, 301, 601 Matching filter
202, 204, 214, 302, 304, 314, 602, 604 Combiner
203, 213, 303, 313, 603 Feedforward filter
206, 216, 306, 316, 606 Feedback filter
207, 307, 607 Subtractor
210, 310 Switch
211, 212, 311, 312 Multiplier
320 Error correcting circuit
321 Multiplication coefficient control circuit
501 Delay element
502 Complex multiplier
503 Combining circuit
504 Complex correlator
505 Delay-adjusting delay element

What is claimed is:

1. A wireless communication system, comprising:
a first wireless communication device; and a second wireless communication device,
the first wireless communication device including:
a time-division multiplexing unit configured to time-division multiplex a first modulated signal and a second modulated signal, and
a transmission unit configured to transmit a time-division multiplexed signal,
the second wireless communication device including:
a time-division demultiplexing unit configured to time-division demultiplex the time-division multiplexed signal into a first demodulated signal and a second demodulated signal,
a first adaptive filter for the first demodulated signal,
a second adaptive filter for the second demodulated signal,
an adaptive control unit configured to perform an adaptive control on the first adaptive filter and output an output of the adaptive control to the second adaptive filter,
a first demodulation unit configured to demodulate an output of the first adaptive filter,
a second demodulation unit configured to demodulate an output of the second adaptive filter.

2. The wireless communication system according to claim 1,
wherein the transmission unit is further configured to time-division multiplex and diversity-transmit the first modulated signal and the second modulated signal, and the time-division demultiplexing unit includes:
a unit configured to diversity combine diversity-transmitted signals using a matching filter, and
a switching unit configured to time-division demultiplex a diversity-combined signal and output demultiplexed signals as the first demodulated signal and the second demodulated signal.

3. The wireless communication system according to claim 1,
wherein the first adaptive filter is configured to perform equalization on the first modulated signal based on the adaptive control by the adaptive control unit, and
the second adaptive filter is configured to perform equalization on the second modulated signal using a tap coefficient obtained by multiplying a tap coefficient in the adaptive control by a multiplier factor.

4. The wireless communication system according to claim 3,
wherein the second wireless communication device further includes a multiplication unit configured to multiple the tap coefficient in the adaptive control by the multiplier factor.

5. The wireless communication system according to claim 3,
wherein the second wireless communication device further includes an error correcting unit configured to perform error correction on an output of the second demodulation unit, and
a multiplication coefficient control unit configured to control a multiplier factor by which the tap coefficient is to be multiplied depending on a result of the error correction.

6. A wireless communication device, comprising:
a time-division demultiplexing unit configured to time-division demultiplex a signal formed by time-division multiplexing a first modulated signal and a second modulated signal into a first demodulated signal and a second demodulated signal;
a first adaptive filter for the first demodulated signal;
a second adaptive filter for the second demodulated signal;
an adaptive control unit configured to perform an adaptive control on the first adaptive filter and output an output of the adaptive control to the second adaptive filter;
a first demodulation unit configured to demodulate an output of the first adaptive filter; and
a second demodulation unit configured to demodulate an output of the second adaptive filter.

7. The wireless communication device according to claim 6,
wherein the time-division demultiplexing unit includes
a unit configured to diversity-combine the first modulated signal and the second modulated signal using a matching filter, the first modulated signal and the second modulated signal being time-division multiplexed and diversity-transmitted, and
a switching unit configured to time-division demultiplex diversity-combined signal and output demultiplexed signals as the first demodulated signal and the second demodulated signal.

8. The wireless communication device according to claim 6,
wherein the first adaptive filter is configured to perform equalization on the first modulated signal based on the adaptive control by the adaptive control unit, and
the second adaptive filter is configured to perform equalization on the second modulated signal using a tap coefficient obtained by multiplying a tap coefficient in the adaptive control by a multiplier factor.

9. The wireless communication device according to claim 8, further comprising:
an error correcting unit configured to perform error correction on an output of the second demodulation unit; and
a multiplication coefficient control unit configured to control a multiplier factor by which the tap coefficient is to be multiplied depending on a result of the error correction.

10. A wireless communication method in a wireless communication device, comprising:
performing an adaptive control on a first adaptive filter; and
outputting an output of the adaptive control to a second adaptive filter,
wherein the wireless communication device includes
time-division demultiplexing unit configured to time-division demultiplex a first modulated signal and a second modulated signal, the first modulated signal and the second modulated signal being time-division multiplexed, into a first demodulated signal and a second demodulated signal,
the first adaptive filter for the first demodulated signal,
the second adaptive filter for the second demodulated signal,
a first demodulation unit configured to demodulate an output of the first adaptive filter, and
a second demodulation unit configured to demodulate an output of the second adaptive filter.

11. The wireless communication system according to claim 2,
wherein the first adaptive filter is configured to perform decision feedback equalization on the first modulated signal based on the adaptive control by the adaptive control unit, and
the second adaptive filter is configured to perform decision feedback equalization on the second modulated signal using a tap coefficient obtained by multiplying a tap coefficient in the adaptive control by a multiplier factor.

12. The wireless communication system according to claim 4,
wherein the second wireless communication device further includes an error correcting unit configured to perform error correction on an output of the second demodulation unit, and
a multiplication coefficient control unit configured to control a multiplier factor by which the tap coefficient is to be multiplied depending on a result of the error correction.

13. The wireless communication device according to claim 7,
wherein the first adaptive filter is configured to perform decision feedback equalization on the first modulated signal based on the adaptive control by the adaptive control unit, and
the second adaptive filter is configured to perform decision feedback equalization on the second modulated signal using a tap coefficient obtained by multiplying a tap coefficient in the adaptive control by a multiplier factor.

* * * * *